United States Patent
Farhat et al.

(10) Patent No.: US 12,471,813 B2
(45) Date of Patent: Nov. 18, 2025

(54) WIRELESS CONTACTLESS CONTINUOUS BIOMARKER SENSOR AND ITS METHODS OF USE

(71) Applicant: American University of Beirut, Beirut (LB)

(72) Inventors: Hoda Farhat, Beirut (LB); Joseph Costantine, Albuquerque, NM (US); Rouwaida Kanj, Cedar Park, TX (US); Youssef Tawk, Albuquerque, NM (US); Assaad Eid, Paris (FR); Ali H. Ramadan, Beirut (LB)

(73) Assignee: American University of Beirut, Beirut (LB)

( * ) Notice: Subject to any disclaimer, the term of this patent is extended or adjusted under 35 U.S.C. 154(b) by 80 days.

(21) Appl. No.: 18/638,014

(22) Filed: Apr. 17, 2024

(65) Prior Publication Data
US 2024/0350046 A1    Oct. 24, 2024

Related U.S. Application Data

(60) Provisional application No. 63/497,796, filed on Apr. 24, 2023.

(51) Int. Cl.
| | | |
|---|---|---|
| A61B 5/145 | (2006.01) | |
| A61B 5/00 | (2006.01) | |
| A61B 5/1477 | (2006.01) | |
| G01S 7/03 | (2006.01) | |
| G01S 7/41 | (2006.01) | |

(Continued)

(52) U.S. Cl.
CPC ........ *A61B 5/1477* (2013.01); *A61B 5/14532* (2013.01); *A61B 5/6816* (2013.01); *G01S 7/03* (2013.01); *G01S 7/411* (2013.01); *G01S 13/003* (2013.01); *G01S 13/88* (2013.01); *A61B 2562/046* (2013.01); *G01S 2013/0245* (2013.01)

(58) Field of Classification Search
CPC . A61B 5/1477; A61B 5/14532; A61B 5/6816; A61B 2562/046; G01S 7/03; G01S 7/411; G01S 13/003; G01S 13/88; G01S 2013/0245
See application file for complete search history.

(56) References Cited

U.S. PATENT DOCUMENTS

| | | |
|---|---|---|
| 8,548,551 B2 | 10/2013 | Kamath et al. |
| 8,808,182 B2 | 8/2014 | Goode et al. |

(Continued)

OTHER PUBLICATIONS

Saha, S., Cano-Garcia, H., Sotiriou, I. et al. A Glucose Sensing System Based on Transmission Measurements at Millimetre Waves using Micro strip Patch Antennas. Sci Rep 7, 6855 (2017) (Year: 2017).*

(Continued)

*Primary Examiner* — Eric J Messersmith
(74) *Attorney, Agent, or Firm* — J. Peter Paredes; Amin Wasserman Gurnani LLP

(57) ABSTRACT

Provided herein are compact sensor continuously and wirelessly senses blood constituents including a mm-wave newly designed sensor validates its ability to correlate received base-band power levels variations, rather than S-parameters, with the variations in blood glucose levels of serum [FBS] and in that of the jugular veins and carotid arteries for animals and humans.

15 Claims, 18 Drawing Sheets

(51) Int. Cl.
    *G01S 13/00*     (2006.01)
    *G01S 13/88*     (2006.01)
    *G01S 13/02*     (2006.01)

(56) References Cited

U.S. PATENT DOCUMENTS

| | | | |
|---|---|---|---|
| 9,282,925 | B2 | 3/2016 | Kamath et al. |
| 9,351,668 | B2 | 5/2016 | Brauker et al. |
| 9,420,968 | B2 | 8/2016 | Kamath et al. |
| 10,231,653 | B2 | 3/2019 | Bohm et al. |
| 10,750,981 | B2 | 8/2020 | Newberry et al. |
| 11,031,970 | B1* | 6/2021 | Bosua .................. A61B 5/0507 |
| 11,229,383 | B2 | 1/2022 | Pikov et al. |
| 2014/0243614 | A1 | 8/2014 | Rothberg et al. |
| 2019/0104939 | A1* | 4/2019 | Costantine ......... H01Q 21/0037 |
| 2020/0046272 | A1 | 2/2020 | Brister et al. |
| 2020/0193326 | A1* | 6/2020 | Leabman ............. H01Q 21/061 |
| 2020/0337610 | A1* | 10/2020 | Yu ........................ A61B 5/6829 |
| 2021/0244308 | A1 | 8/2021 | Bosua |
| 2022/0045554 | A1* | 2/2022 | Leabman ................ H02J 50/40 |
| 2022/0192493 | A1 | 6/2022 | Leabman |
| 2022/0296111 | A1* | 9/2022 | Leabman ............... A61B 5/681 |
| 2023/0041114 | A1 | 2/2023 | Seider et al. |
| 2023/0067282 | A1 | 3/2023 | Halac et al. |
| 2024/0306951 | A1* | 9/2024 | Cronin ............... A61B 5/14532 |

OTHER PUBLICATIONS

WIPO/ISA/US, International Search Report issued in International Application No. PCT/US2024/019081 on Jul. 30, 2024, 9 pages.
Amir, O., et al. "Optical Non-Invasive Glucose Monitoring: Continuous Noninvasive Glucose Monitoring Technology Based on "Occlusion Spectroscopy"." Journal of diabetes science and technology (Online) 1.4 (2007): 463-469.
Chen, A., et al. "Development of a $ Ka $-band wideband circularly polarized 64-element microstrip antenna array with double application of the sequential rotation feeding technique." IEEE antennas and wireless propagation letters 10 (2011): 1270-1273.
Choi, H., et al. "Microwave noninvasive blood glucose monitoring sensor: Human clinical trial results." 2017 IEEE MTT-S International Microwave Symposium (IMS). IEEE, 2017, 876-879.
Farhat, H., et al. "A V-Band Highly Directive Circularly Polarized Antenna Array for Wireless and Contactless Continuous Glucose Monitoring." 2023 IEEE International Symposium on Antennas and Propagation and USNC-URSI Radio Science Meeting (USNC-URSI). IEEE, 2023, 1271-1272.
Farhat, H., et al. "Wireless Continuous Glucose Monitoring using V-Band Circularly Polarized Directive Antenna Arrays in a Transmit/Receive System." IEEE Transactions on Antennas and Propagation (2024), 7005-7016.
Hadar, E., et al. "Noninvasive, continuous, real-time glucose measurements compared to reference laboratory venous plasma glucose values." The Journal of Maternal-Fetal & Neonatal Medicine 32.20 (2019): 3393-3400.
Harman-Boehm, I., et al. "Noninvasive glucose monitoring: a novel approach." J Diabetes Sci Technol 2009;3 (2):253-260.
Hussain, N. et al. "A metasurface-based low-profile wideband circularly polarized patch antenna for 5G millimeter-wave systems." IEEE Access 8 (2020): 22127-22135.
Koutsoupidou, M., et al. "Study and suppression of multipath signals in a non-invasive millimeter wave transmission glucose-sensing system." IEEE Journal of Electromagnetics, RF and Microwaves in Medicine and Biology 4.3 (2019): 187-193.
Pfützner, A., et al. "System accuracy assessment of a combined invasive and noninvasive glucometer." Journal of diabetes science and technology 14.3 (2020): 575-581.
Saha, S., et al. "A glucose sensing system based on transmission measurements at millimetre waves using micro strip patch antennas." Scientific reports 7.1 (2017): 6855, 11 pages.
Zhang, T., et al. "A low-cost and high-gain 60-GHz differential phased array antenna in PCB process." IEEE Transactions on Components, Packaging and Manufacturing Technology 8.7 (2018): 1281-1291.

* cited by examiner

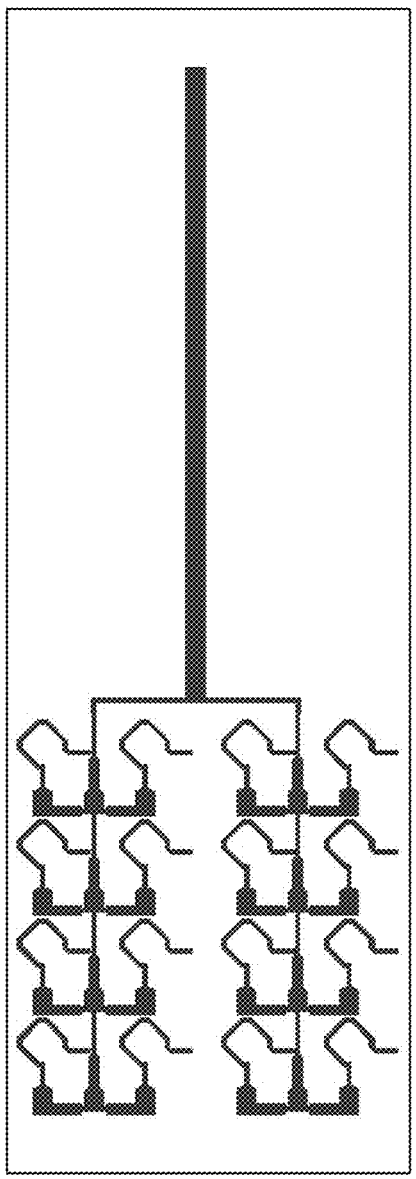
FIG. 8
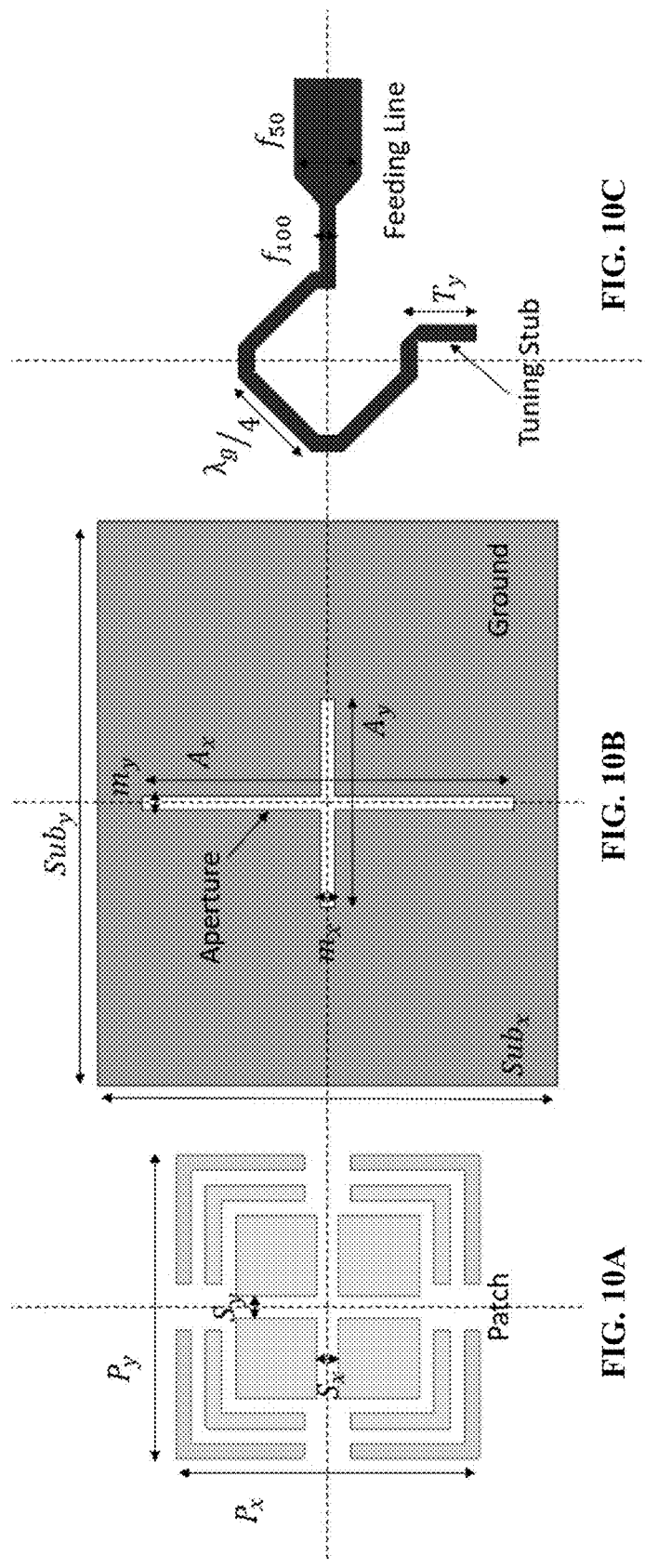
FIG. 10C
FIG. 10B
FIG. 10A

WIRELESS CONTACTLESS CONTINUOUS BIOMARKER SENSOR AND ITS METHODS OF USE

CROSS-REFERENCE TO RELATED APPLICATIONS

The present application claims priority to U.S. provisional application Ser. No. 63/497,796, filed Apr. 24, 2023, herein incorporated by reference in its entirety.

BACKGROUND

In the past years, antennas (including arrays) have been used for a wide variety of medical applications, most notably biomarker sensing, imaging and hyperthermia treatment of cancer.

Building millimeter (mm) wave operable designs lead to both size reduction and ease of embedment into portable devices.

Antenna feeding techniques are one of the most challenging bottlenecks of the design.

In on-body telemetry, common human tissue activities and posture movements turn it virtually hard for an on-body antenna to have a fixed orientation relative to an external receiver. The adoption of circular polarization and wide beamwidth characteristics would be an excellent solution due to their inherent immunity to time-varying orientations between the transmitters and the receivers.

Despite the above advantage, only a few researchers have focused on the design of mm-wave miniaturized on-body circularly polarized antenna arrays for biomarker sensing.

The present invention attempts to solve these problems as well as others.

SUMMARY OF THE INVENTION

Provided herein are compact sensors that continuously and wirelessly senses blood constituents as part of a transmit/receive system at millimeter wave. The compact sensors include mm-wave newly designed antenna arrays. The sensing system validates its ability to correlate received baseband power levels variations, rather than S-parameters, with the variations in blood glucose levels of serum [FBS] and in that of the jugular veins and carotid arteries for animals and humans.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

In the accompanying figures, like elements are identified by like reference numerals among the several preferred embodiments of the present invention.

FIG. 8 is a top view of the Feeding Network.

FIG. 10A-10C are top views of the Radiating Element Design.

DETAILED DESCRIPTION OF THE INVENTION

Figure 1A:
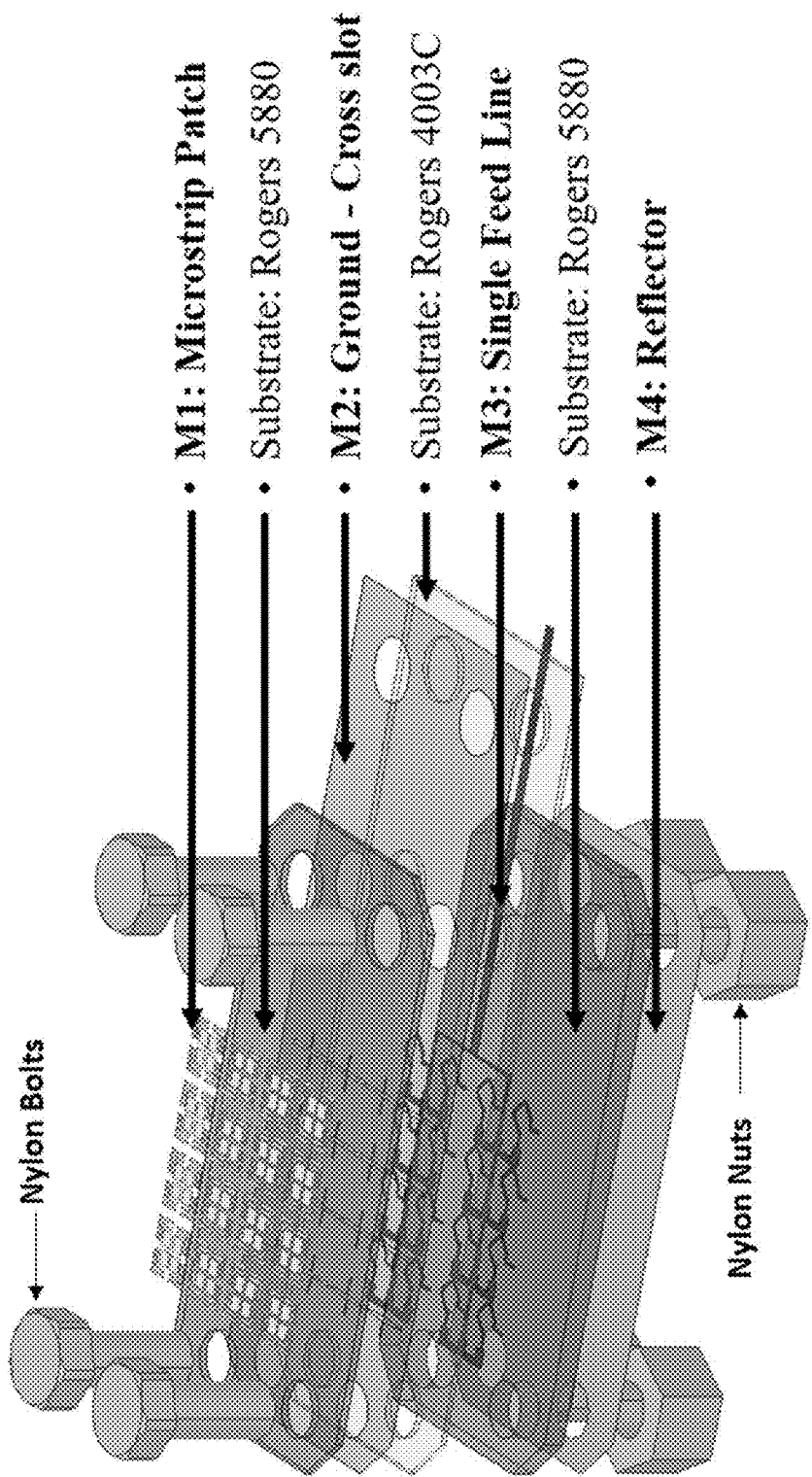
FIG. 1A is an exploded view of the Sensor Model: 16-element 4×4 antenna array stack-up structure with assembled nylon bolts and nuts.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes, or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Description of Embodiments

Generally speaking, the wireless sensor is composed of a transmitting antenna array of N×N elements and a receiving antenna array of N×N elements. The transmitting antenna array transmits a directive beam through a vein, an artery, or a group of blood vessels into a receiving antenna array that receives the signal sent by the transmitter. The received signal can be read through a dedicated receiver circuit at the operational frequency of the antenna array or can be down-converted to a baseband signal between about 100 MHz and about 600 MHz. The magnitudes of the received signal are captured and monitored. Any change in these magnitudes is attributed to a change in certain blood biomarkers such as glucose among others. Both transmitting and receiving antenna arrays operate at any frequency between about 1 MHz to about 300 GHz. Both transmitting and receiving antenna arrays can be narrowband or wideband. Both transmitting and receiving antenna arrays have the same polarization orientation. In one embodiment, they are both circularly polarized.

Figure 1B:
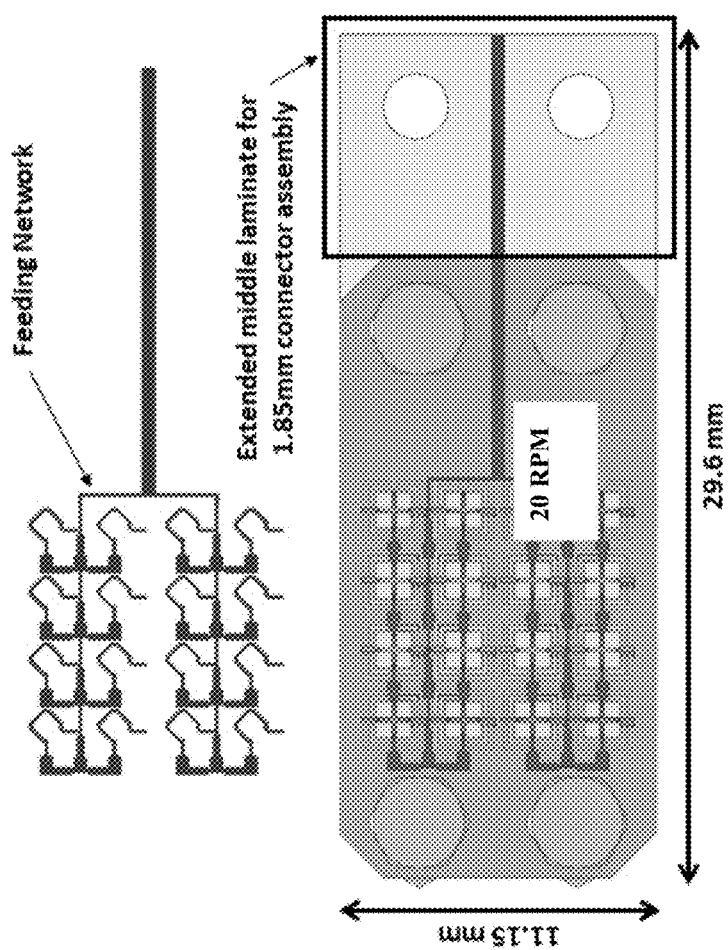
FIG. 1B is a top view of the Sensor Model showing the feeding networks and the extended middle laminate for 1.85 connector assembly.

In one embodiment, the wireless sensor is composed of 4×4 elements to operate at V-Band for both the transmitter and receiver. Each antenna array is composed of 16 radiating elements separated by a spacing of about 0.125λ, as shown in FIG. 1. Within the same embodiment, the antenna array has four copper layers. The top layer consists of 16 radiating microstrip patches forming the sensing area. The second layer is ground with 16 cross slots. The third layer is a series feeding network using "T" power dividers and sequential rotation underneath each cross slot with a single feed at the input. The bottom layer of the antenna array is a metal plane realized as a reflector. Each two consecutive conductive layers are separated by a dielectric material.

In one embodiment, the antenna array (the sensor) achieves wide-band circular polarization by using a cross-slot design and sequential rotation feeding. The antenna array is designed using a variety of laminates with different dielectric materials and/or different thicknesses, as shown in FIG. 2.

The top layer [M1] of the antenna array is comprised of a rectangular patch design to resonate at the intended frequency range within the millimeter range of the spectrum and in particular at about 62.25 GHz with a cross in its geometry exactly above the aperture exciting the antenna array elements. Each patch has two consecutive perpendicular slots at each of its four corners to help emphasize circular polarization, as shown in FIG. 3.

The top layer of the antenna array represents the sensing area. Placing these radiating elements at a small distance from both sides of the material under test i.e., as RF transmitter and receiver antennas will cause a specific shift in the received power level. Electromagnetic wave propagation principles merged with data analytic algorithms can be implemented to extract and monitor variations of the concentration of the blood constituent from the interaction between electromagnetic wave propagation and the blood vessels.

Figure 2:
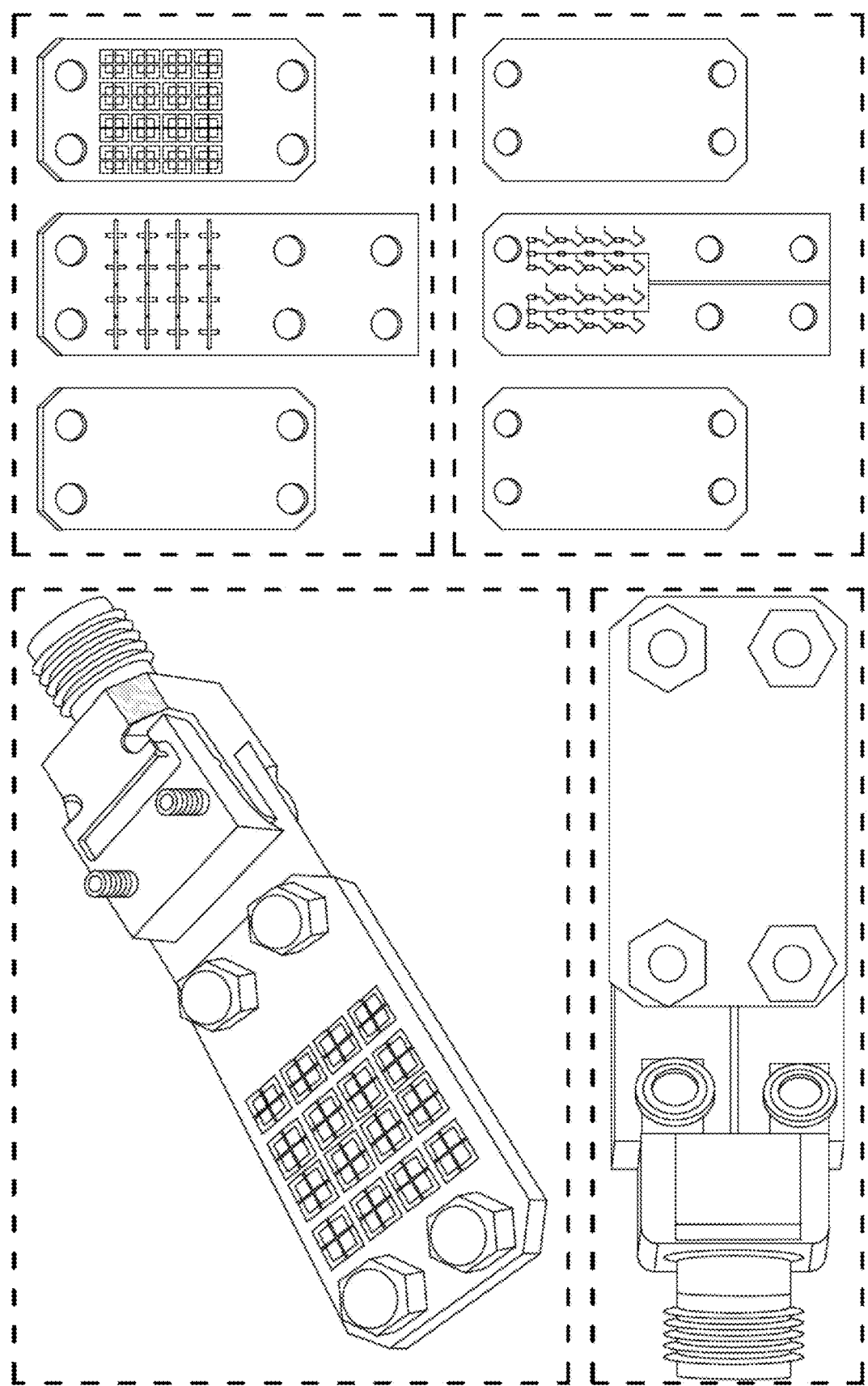
FIG. 2 is a perspective view of the Fabricated Sensor Model Embodiment: 16-element 4×4 antenna array with 1.85 mm connector showing top and bottom view of fabricated layers
Figures 3A, 3B:
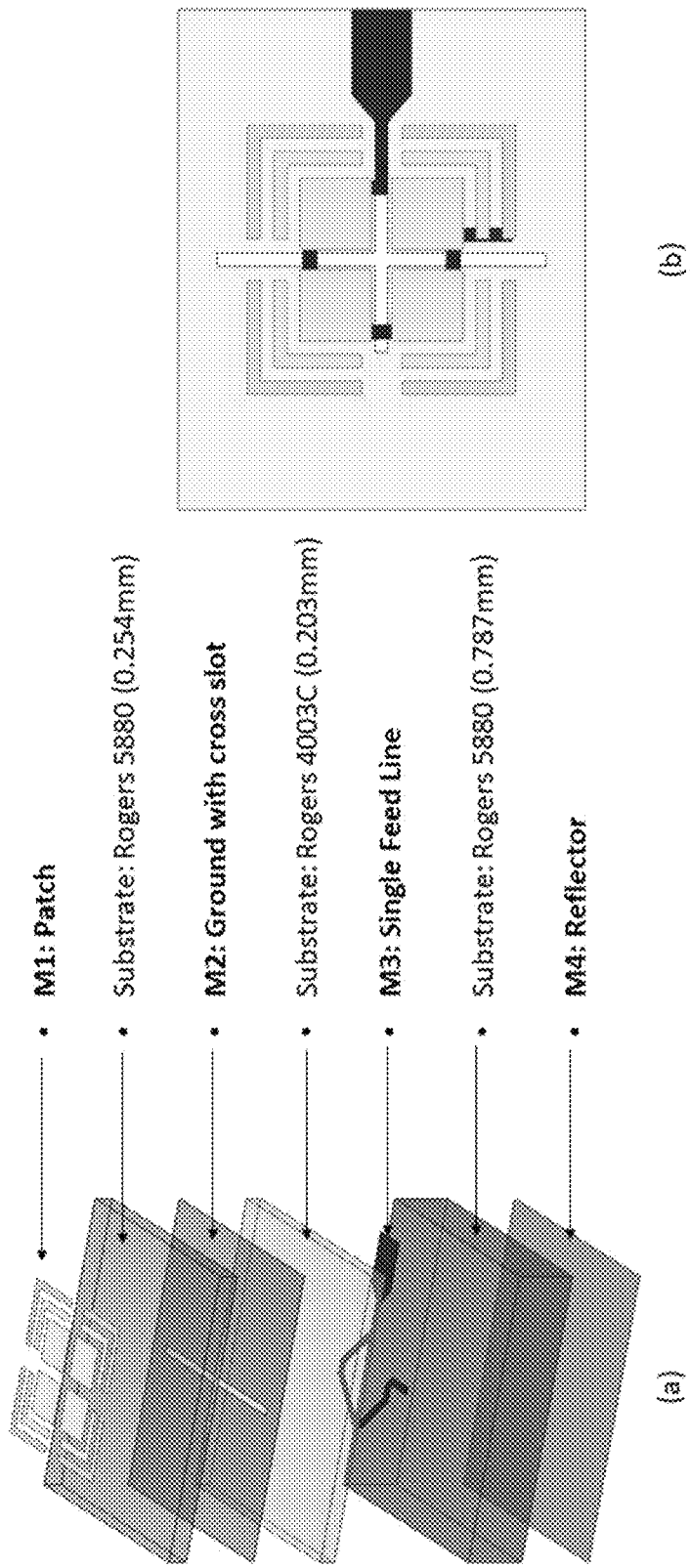
FIG. 3A is an exploded view of the design of one radiating element in one embodiment.
FIG. 3B is a top view.

The second layer [M2] of the antenna array, shown in FIGS. 1-3, is comprised of a ground plane. Sixteen cross slots are etched from this plane to represent sixteen apertures to feed a multi-layer structure antenna array. The dimensions of the cross-slot are optimized to attain circular polarization as shown in FIG. 1.

The third layer [M3] of the antenna array is comprised of a series-feeding network such that each aperture is fed with a single hook-shaped feeding line. The feeding network is shown for a single element, as shown in FIG. 3.

Figure 5A:
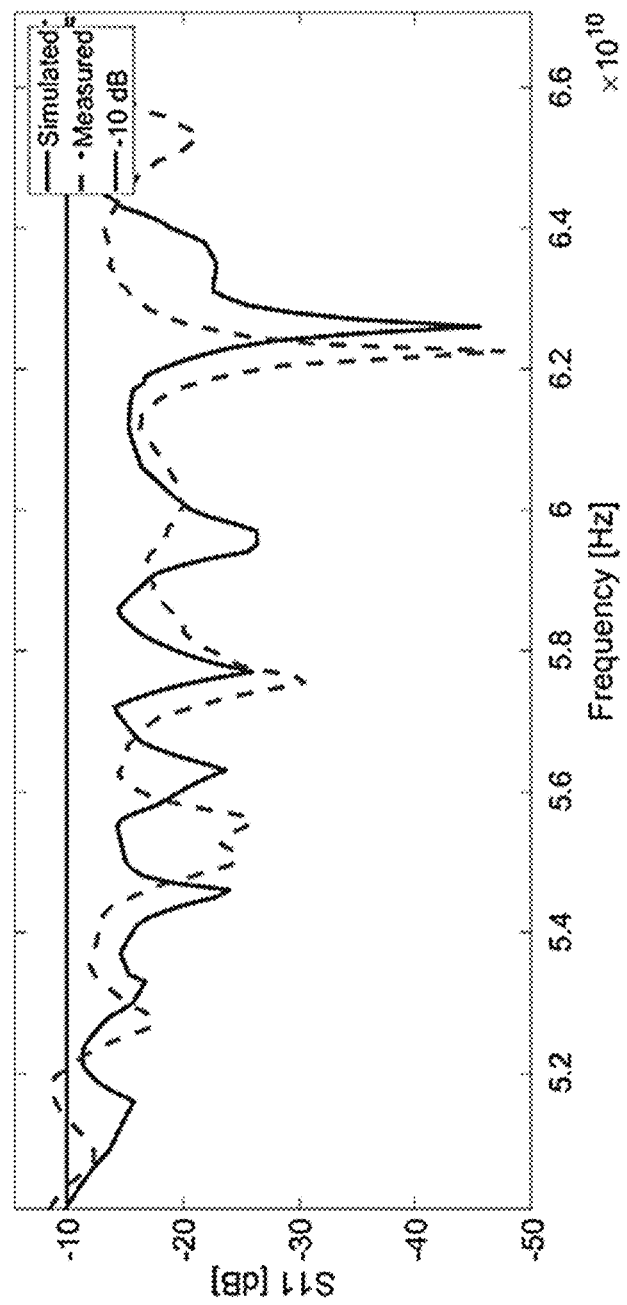
FIG. 5A-5C are graphs showing the antenna array's reflection coefficient, axial ratio, and radiation pattern at 62.25 GHz confirm that the antenna array is highly directive and circularly polarized.
Figure 5B:
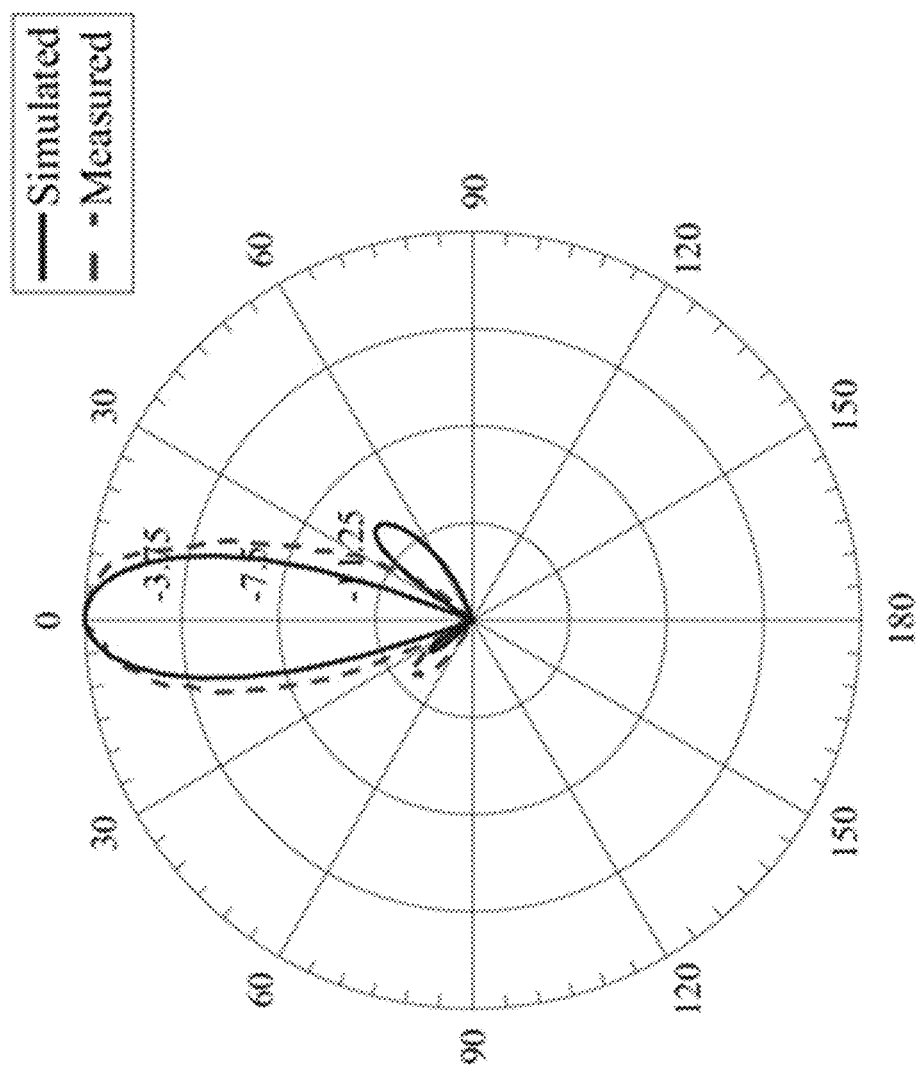
Figure 5C:
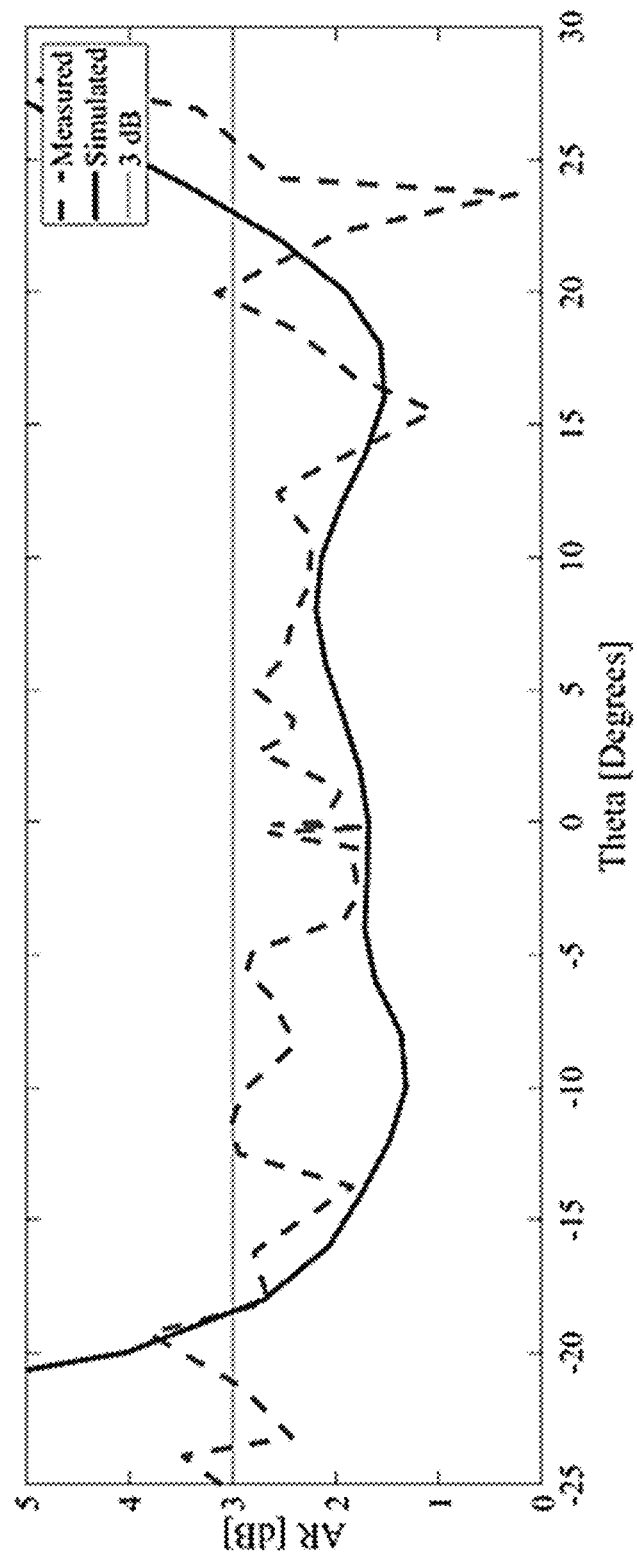

The bottom layer [M4] of the antenna array is a full-plane reflector used for an about 62.25 GHz antenna array to hinder back lobe radiations of the slots in a multi-layer structure, as shown in FIG. 3. The antenna array's performance is demonstrated in FIG. 5. The antenna array has an extended middle laminate.

Figure 4:
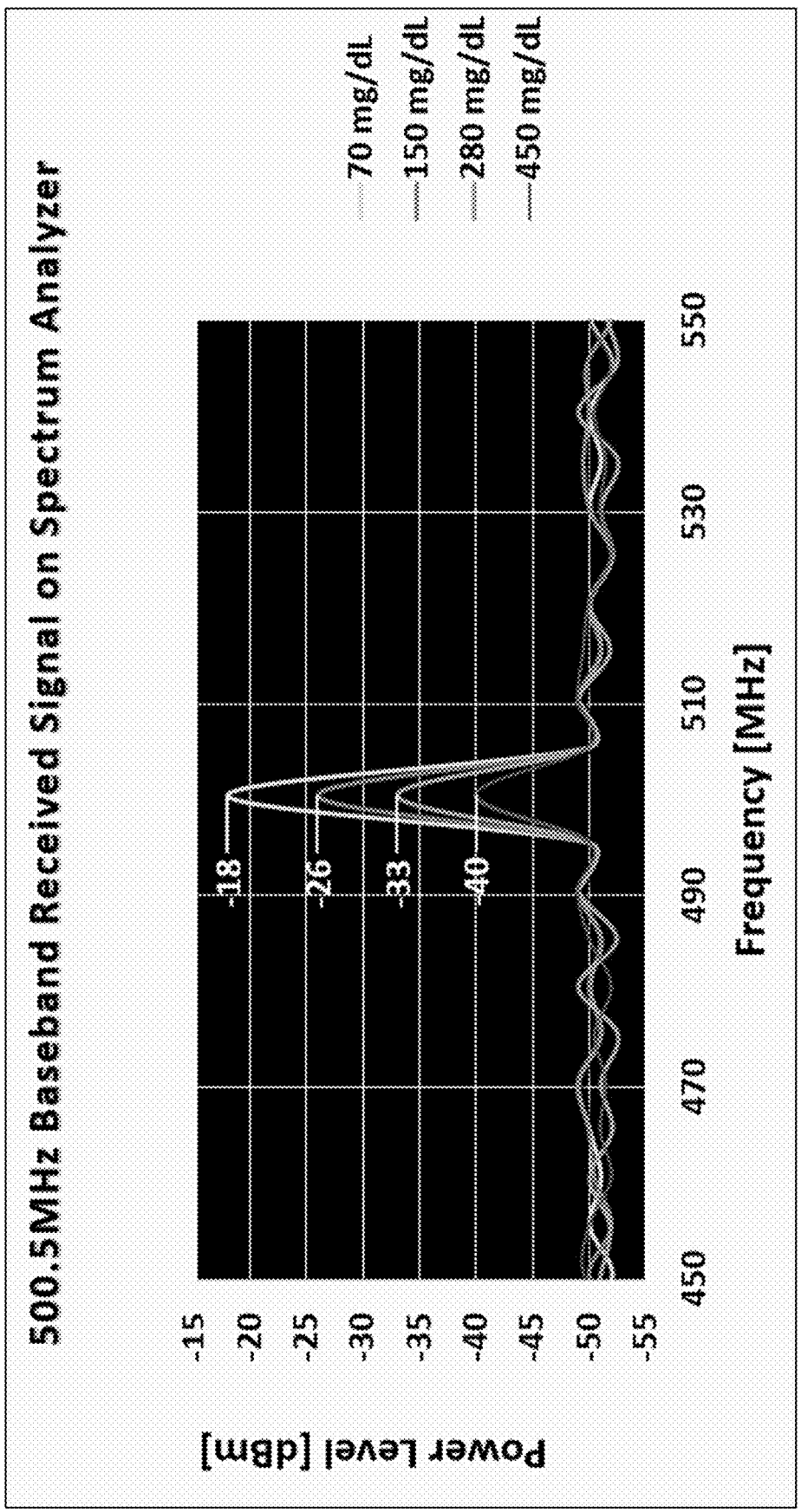
FIG. 4 is a graph showing the received power levels at the baseband level from the receiver side of one embodiment in function of glucose variations in blood.
Figure 6:
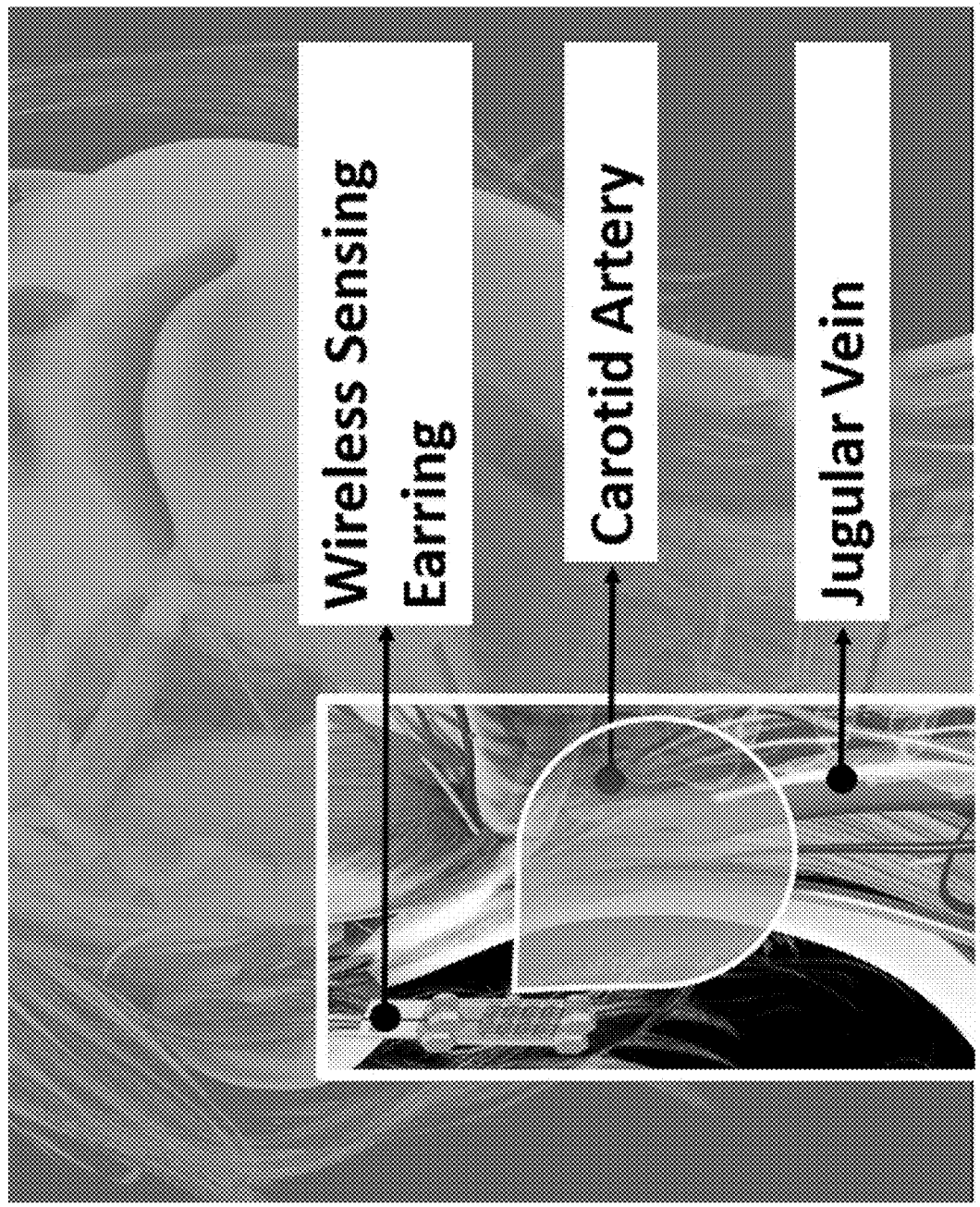
FIG. 6 is a One embodiment of a 4×4 antenna array with radiating electromagnetic waves targeting both jugular veins and carotid arteries in the neck of a human model.
Figure 7:
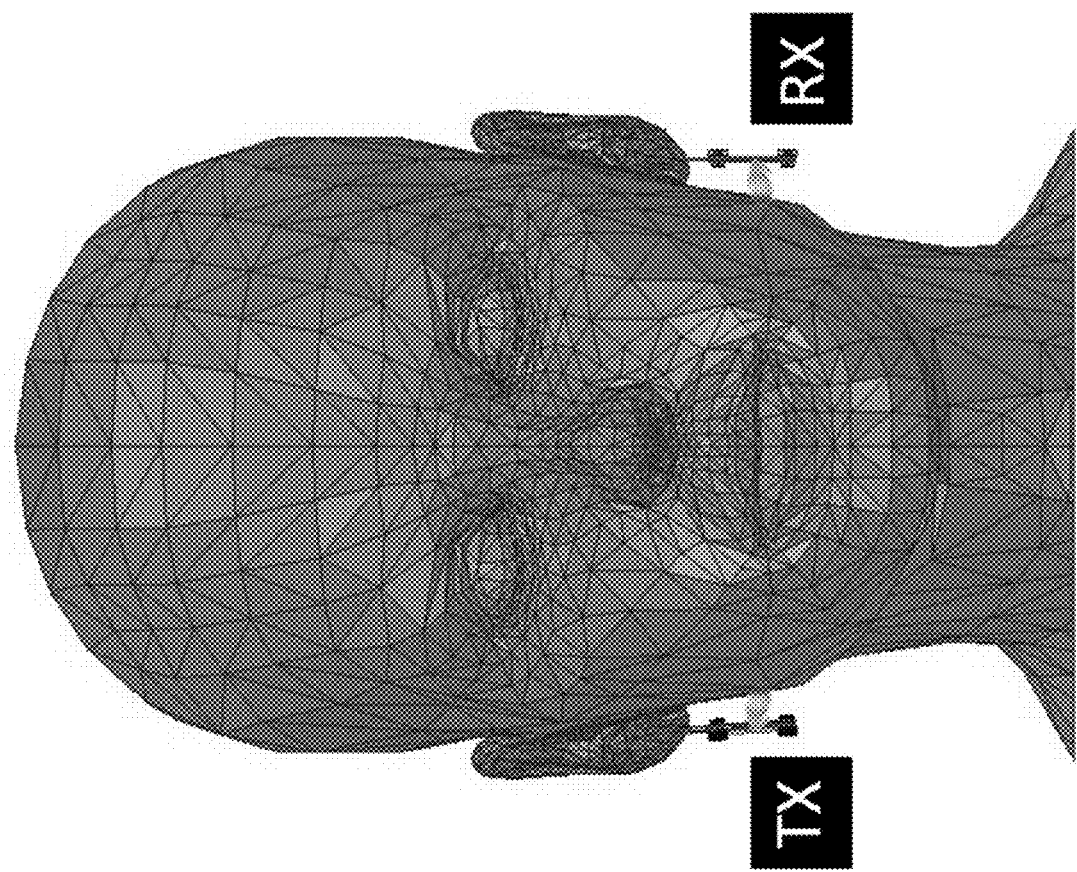
FIG. 7 is the wireless sensing device on a human head model with TX/RX 3D radiating beams.

In one embodiment, two extremely miniaturized 62.25 GHz 4×4 multilayer structure antenna arrays with circular polarization can be implemented as two wireless sensors targeting both jugular veins and carotid arteries in the neck with sufficient blood concentration. These sensors are capable of detecting various biomarker concentrations and in particular glucose among others. A transmitted signal from one antenna array is received by an antenna array at the receiver side. The received signal is down-converted to the baseband, where the received power level varies with the varied glucose concentration in blood, as shown in FIG. 4. A depiction of the antenna array's implementation is shown in FIG. 6 and FIG. 7.

One antenna array is connected to a transmitter of an about 57 to an about 64 GHz transmitter/receiver system and the other is connected to the receiver end. The data analysis of the sensing system is then implemented at the base-band level. The proposed system is designed to present a high correlation between the power level received at the base-band level and the variation in the concentration of blood constituents.

The signal measured from the receiver is converted using algorithms that allow the transformation of the magnitude of the received power levels into the concentration of the blood constituents via trained models.

In another embodiment, the antenna array can be designed to be a phased array with a continuous beamforming ability, which develops a narrow beam that can be steerable in any desirable sensing direction without changing the position of the antenna. The phased antenna array at the transmitter can be met with another phased antenna array at the receiver side to capture the transmitted signal, as shown in FIG. 7.

In another embodiment, one antenna array at the transmitter can be used as a phased antenna array that continuously scans the blood vessels with a narrow beam. The reflected wave is then read and analyzed at the input of the transmitting antenna to extract the various levels of blood biomarkers such as glucose.

Antenna Array Design Embodiments

Circular polarization can be achieved only when the magnitudes of the two vector components of the electric field are equal and orthogonal and the time-phase difference between them is odd multiples of about 90°.

The cross aperture proves to be the best approach used to retain the symmetry in the radiation pattern and better induce a circularly polarized radiation beam for antenna arrays designed at about 60 GHz and beyond. Hence, we adopt the design of cross aperture in both the ground and the rectangular patch, as well, to help emphasize circular polarization.

The sequential rotation approach introduces the possibility of designing circularly polarized antennas from linearly polarized elements with single feed. In general, the feeding structure of CP antenna may be divided into single and hybrid feeding. A single-feeding CP antenna provides simple structure, easy manufacturing, and an advantage for miniaturized antennas. However, it has narrow axial ratio bandwidth. Hybrid feeding gives complex structure, difficult manufacturing, and larger antenna size, but it provides wide axial ratio bandwidth. The aperture of our radiating element is fed using a single series-fed technique with sequential rotation to avoid using double path feed line or a hybrid ring.

Feeding Network

The antenna array is fed by aperture coupling. Each aperture is fed using a single series-fed technique with sequential rotation to avoid using double-path feed line or a hybrid ring.

As shown in FIG. 8, the length of the feeding line between every two apertures is $\lambda/4$ to apply sequential rotation used for circular polarization. The tuning stub along with the width and length of the cross aperture was optimized. The 16-element antenna array is then series-fed using T-power dividers.

Substrates

The sensor is composed of three Rogers laminates stacked using nylon bolts and nuts. Rogers5880 laminate (d=0.25 mm). Rogers4003C laminate (d=0.2 mm). Rogers5880 laminate (d=0.787 mm)

For the antenna element to achieve high efficiency at mm-wave frequencies, the thickness of the substrates is chosen to be as small as possible with a dielectric constant that usually degrades gradually once operating above 40 GHz.

With the benefits of low dielectric constant and low-loss tangent, a Rogers5880 substrate (d=0.25 mm, $\varepsilon_r$=1.94, and tan $\delta$=0.0009 is used for the antenna design at 62.25 GHz. To reduce feeding loss, a Rogers4003C substrate (d=0.2 mm, $\varepsilon_r$=3.38, and tan $\delta$=0.0027 is introduced between the ground and the feeding network.

Experimental Setup Design

Two extremely miniaturized about 62.25 GHz 4×4 multilayer structure antenna arrays with circular polarization are implemented as two wearable sensors targeting both jugular veins and carotid arteries in the neck with sufficient blood concentration Both 4×4 antenna arrays are connected to TX and RX boards respectively using two WR-15 to 1.85 mm adapters. TX/RX boards are fixed on two tripods and powered through USB ports. The RF source operating frequency is set using the synthesizer frequency box of the controller. This control sets the synthesizer digital divisor ratio in the RF module.

Figure 9A:
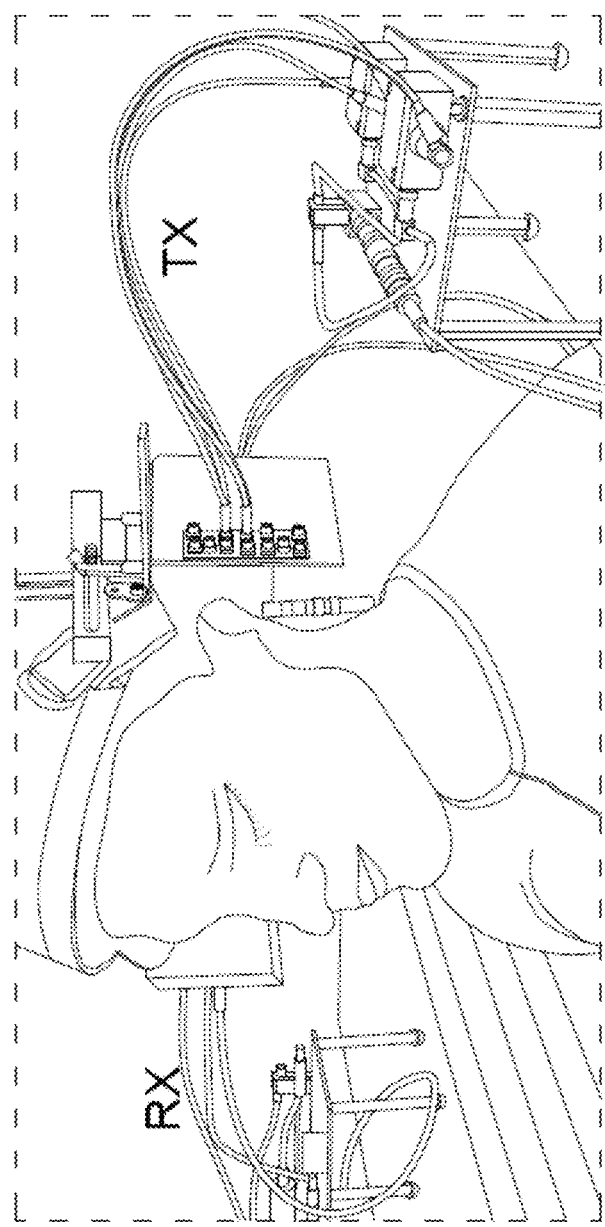
FIGS. 9A-9C are photographs of Human Experiments Setup and Sensor Alignment.
Figure 9C:
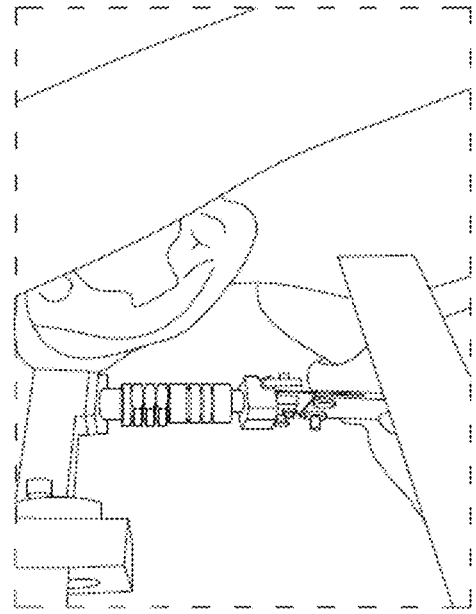
Figure 9B:
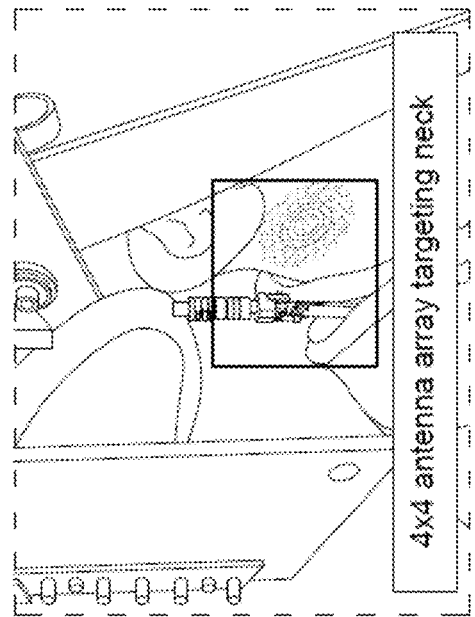

The standard frequency range can be set from about 57.24 GHz to about 64.8 GHz in about 540 MHz steps. With an increased number of features, the sensitivity will increase FIGS. 9A-9C are photographs of Human Experiments Setup and Sensor Alignment.

Measured Metrics

The RF sensor is intended to be placed at a distance from the volunteer such that bio-sensing takes place in the frequency range about 57-about 64 GHz while data analysis is performed at the base-band level.

At each high-frequency transmitted signal, the about 500.5 MHz base-band received signal is visualized on a spectrum analyzer such that the variations in the received power level in dBm are recorded with every instantaneous change in the biomarker.

Predictive Modeling for Selection of Critical Features

The sensor is connected to a signal processing system to convert the magnitude and/or the phase into concentration of the blood constituents. The predictive modeling for selection of critical features comprises steps 1-5.

Step 1 includes the measurements of received power levels at about 500.5 MHz

Step 2 includes the preprocessing of the data includes outlier and noise removal using different techniques (wavelet, moving average filters or other types of filters).

Step 3 includes feature extraction from the power levels sampled into different frequency components and the features are then normalized (between −1 and 1) comprise: Remove the reference value, Remove the mean of each metric, and Divide by the maximum of each metric Step 4: Modeling, calibrating and tuning includes Regularized regression is used to predict the glucose concentrations (Lasso, PLS, Hybrid models, . . . ) and Single feature model and multiple-feature model, time based models Step 5: Recalibrating model for enhanced accuracy.

Design Features

Wireless sensor to detect and monitor variations in blood constituents from a distance. An extremely miniaturized sensor that allows its usage as an earring in one embodiment along with integration with millimeter wave transceiver chips. Rather than depending on S-parameters levels at millimeter wave frequencies, data analysis is performed at the base-band level. Designing an about 62.25 GHz RF-based sensor enhances the sensitivity of the system.

The Antenna Array features allow combating the severe propagation loss, the capability to shape, switch or scan the propagating beam, and designing a highly directive sensor with a very narrow beam that increases the sensitivity. Circular polarization feature allows the sensor to combat the effects of multipath distortion and to combat polarization mismatching.

The design of the radiating element of the sensor along with its feeding network is best optimized to attain wideband circular polarization. FIG. 10 shows the Radiating Element Design embodiment.

TABLE 1

Radiating Element Dimensions

| Parameter | Value (in mm) | Parameter | Value (in mm) |
|---|---|---|---|
| $P_x$ | 2.04 | $A_x$ | 1.4 |
| $P_y$ | 2.04 | $A_y$ | 2.5 |
| $S_y$ | 0.15 | $m_x$ | 0.1 |
| $S_x$ | 0.15 | $m_y$ | 0.1 |
| $Sub_x$ | 3.8 | $T_y$ | 0.5 |
| $Sub_y$ | 3.1 | $f_{100}$ | 0.1 |
| $\lambda_g/4$ | 0.82 | $f_{50}$ | 0.45 |

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example: Experiments on Fetal Bovine Serum Solutions

Figure 11A:
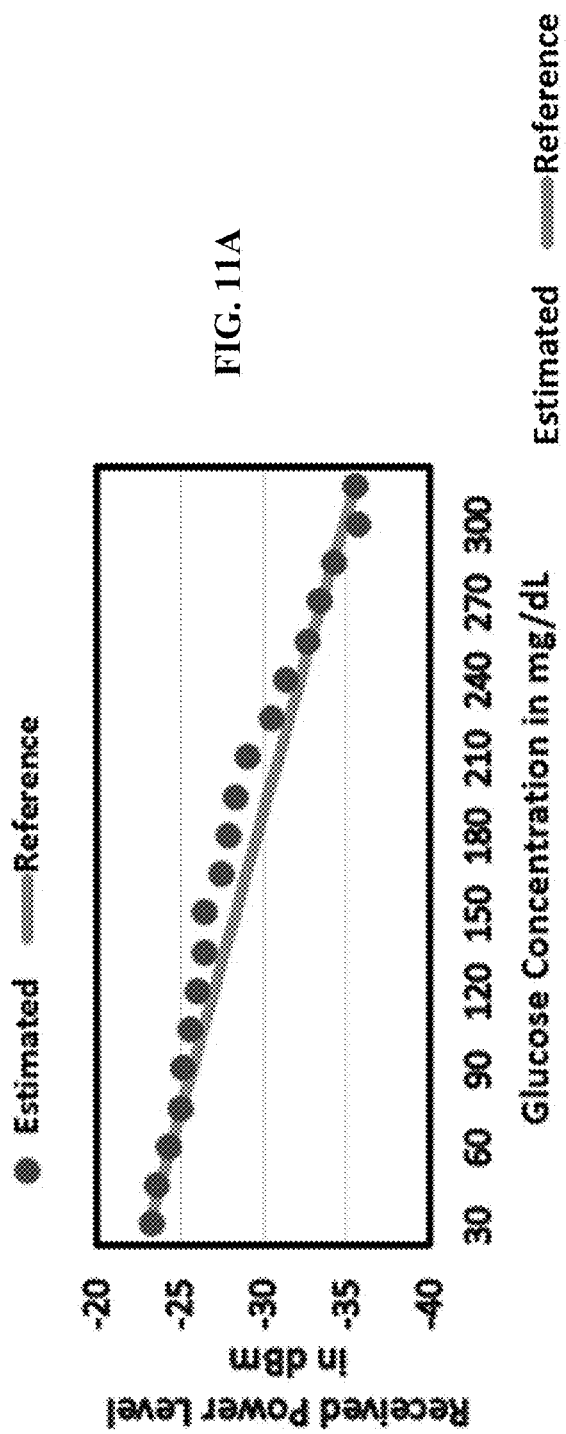
FIGS. 11A-11B are graphs showing the estimated and reference of the glucose concentration from 30 mg/dL to 300 mg/dL as measured by the received power level in dBm.
Figure 11B:
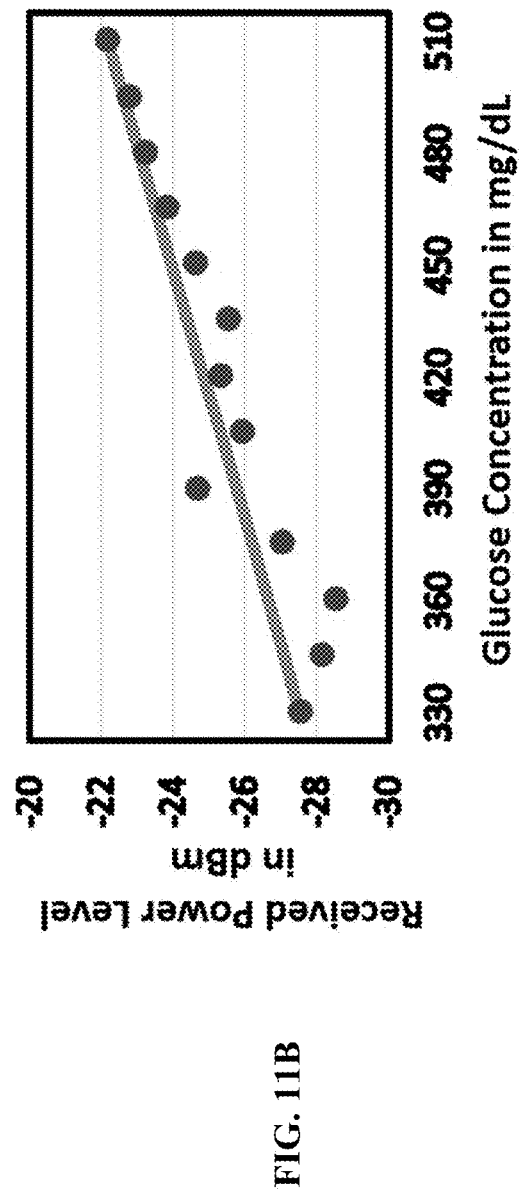

FIGS. 11A-11B are graphs showing the estimated and reference of the glucose concentration from 30 mg/dL to 300 mg/dL as measured by the received power level in dBm.

Figure 12A:
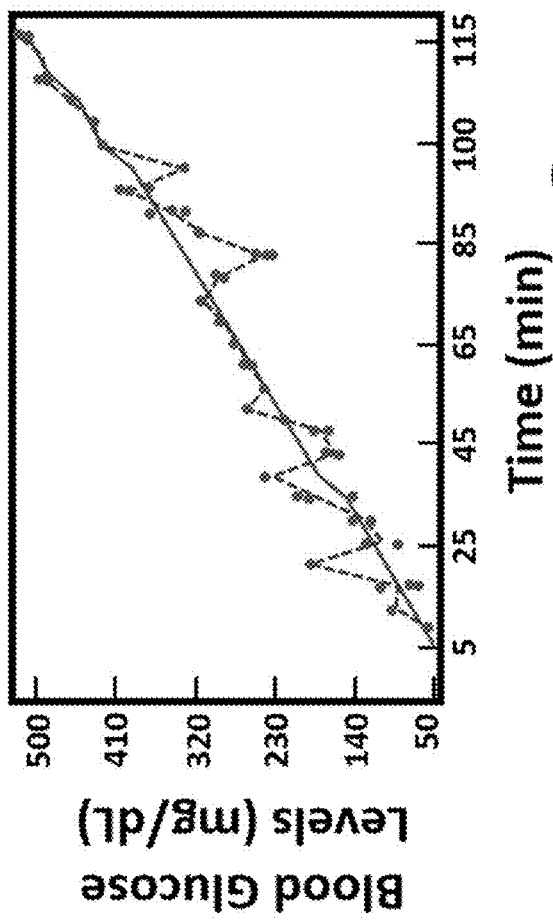
FIG. 12A is a graph showing the blood glucose levels in (mg/dL) over a time period of 5 minutes to 115 minutes.
Figure 12B:
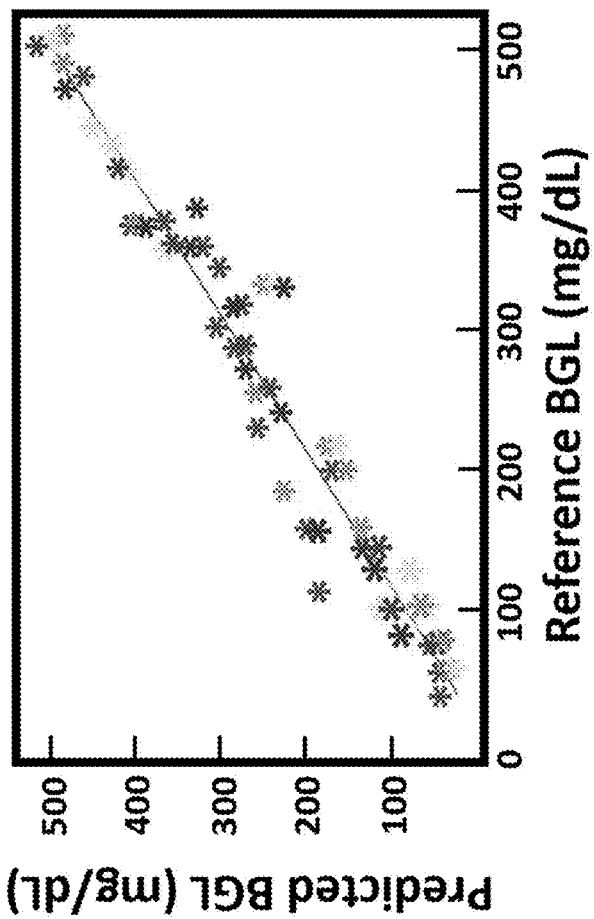
FIG. 12B is a graph showing the predicted Blood Glucose Levels (BGL) mg/dL over a reference BGL from 0 mg/dL to 500 mg/dL.

FIG. 12A is a graph showing the blood glucose levels in (mg/dL) over a time period of 5 minutes to 115 minutes. FIG. 12B is a graph showing the predicted Blood Glucose Levels (BGL) mg/dl over a reference BGL from 0 mg/dL to 500 mg/dL.

Figure 13:
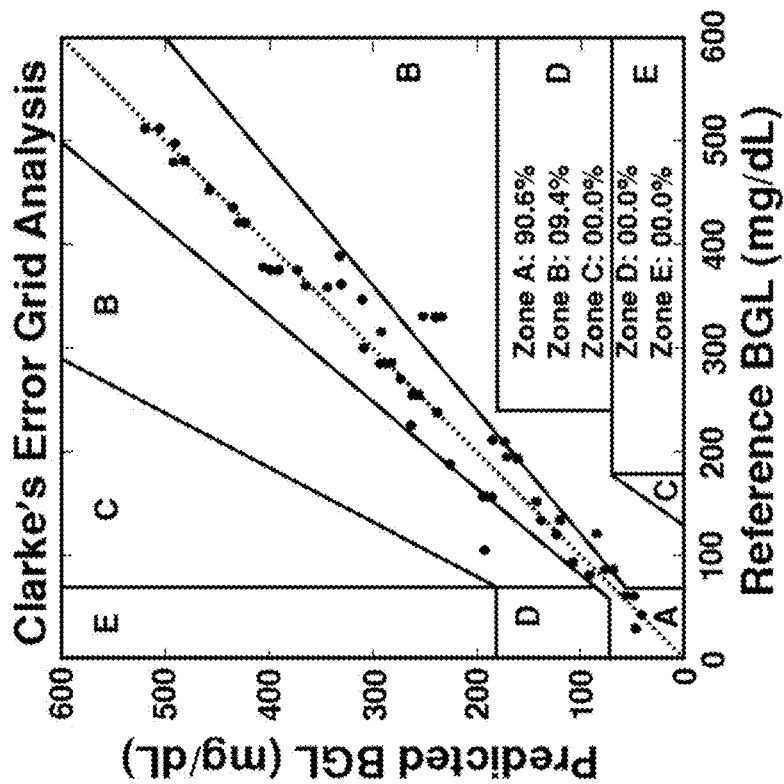
FIG. 13 is a graph of the Clarke's Error Grid analysis showing the Predicted BGL (mg/dL) vs. the Reference BGL mg/dL from 0 to 600 mg/dL.

FIG. 13 is a graph of the Clarke's Error Grid analysis showing the Predicted BGL (mg/dL) vs. the Reference BGL mg/dL from 0 to 600 mg/dL.

Example: In-Vivo Experiments on Animal Models

Figure 14A:
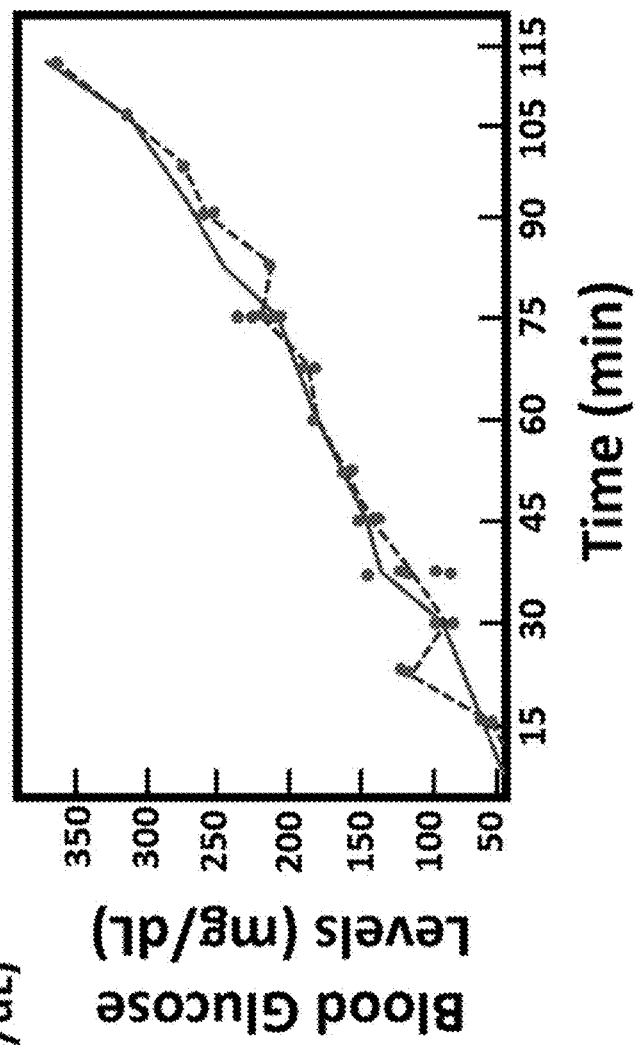
FIG. 14A is a graph showing the predicted blood glucose levels (BGL) in (mg/dL) over a reference BGL from 0 mg/dL to 400 mg/dL.
Figure 14B:
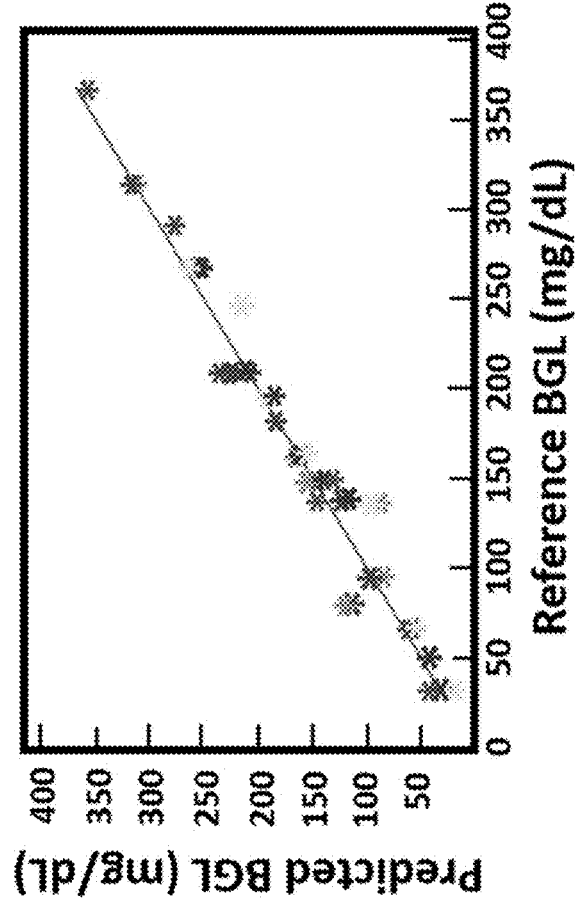
FIG. 14B is a graph showing the Blood Glucose Levels (BGL) mg/dL vs. a time period of 5 minutes to 115 minutes.

FIG. 14A is a graph showing the predicted blood glucose levels (BGL) in (mg/dL) over a reference BGL from 0 mg/dL to 400 mg/dL. FIG. 14B is a graph showing the Blood Glucose Levels (BGL) mg/dL over a time period of 5 minutes to 115 minutes.

Figure 15:
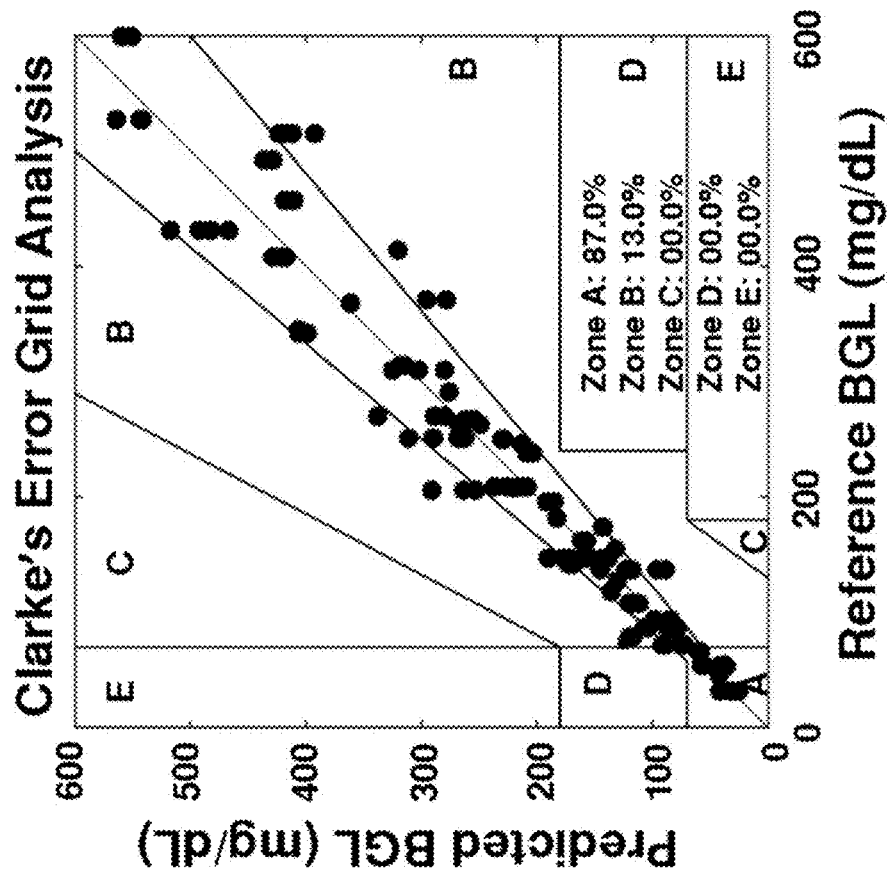
FIG. 15 is a graph of the Clarke's Error Grid analysis showing the Predicted BGL (mg/dL) vs. the Reference BGL mg/dL from 0 to 600 mg/dL.

FIG. 15 is a graph of the Clarke's Error Grid analysis showing the Predicted BGL (mg/dL) vs. the Reference BGL mg/dL from 0 to 600 mg/dL.

Example: Clinical Studies

Figure 16A:
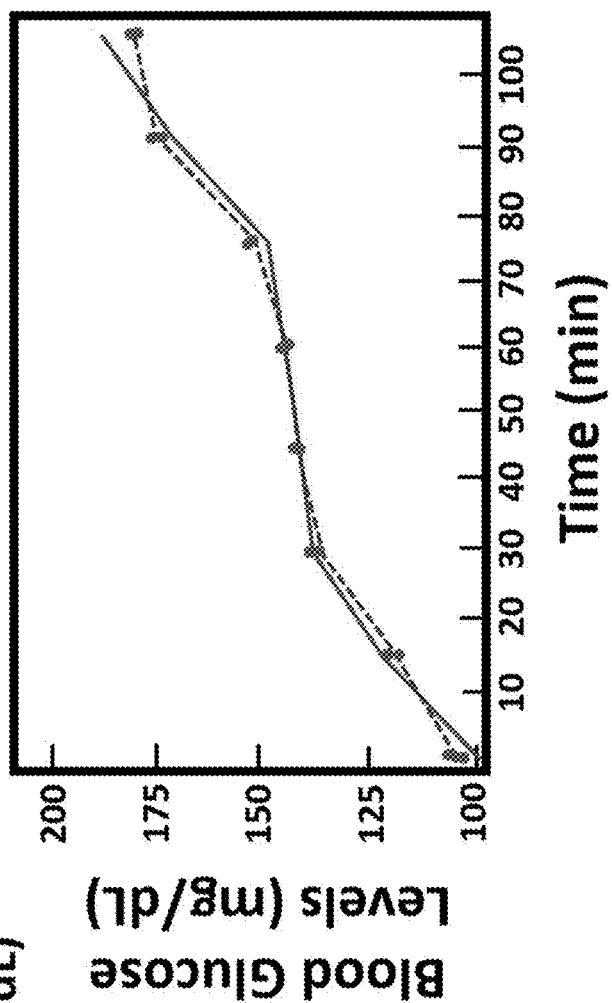
FIG. 16A is a graph showing the predicted blood glucose levels (BGL) in (mg/dL) vs. a reference BGL from 0 mg/dL to 400 mg/dL.
Figure 16B:
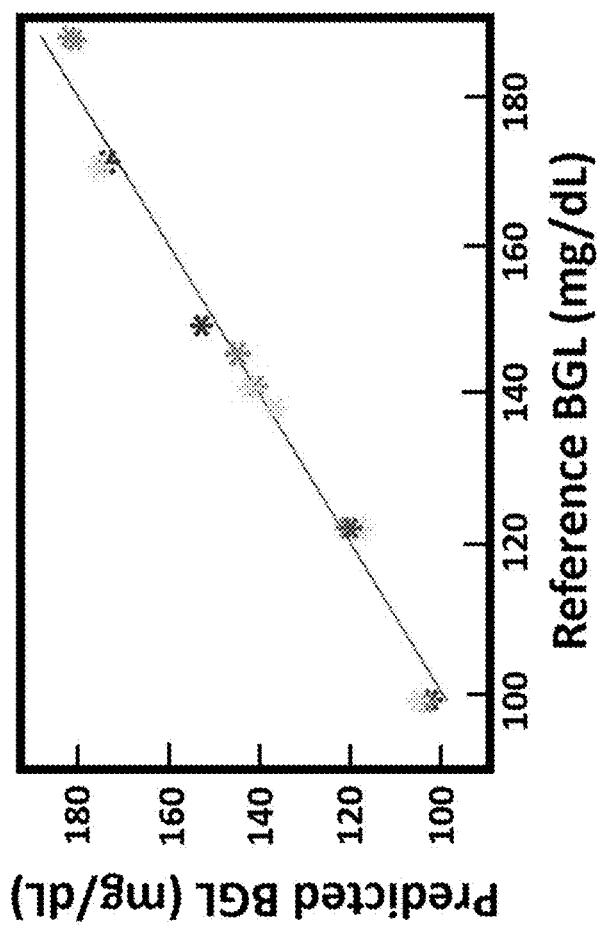
FIG. 16B is a graph showing the Blood Glucose Levels (BGL) mg/dL over a time period of 0 minutes to 100 minutes.

FIG. 16A is a graph showing the predicted blood glucose levels (BGL) in (mg/dL) over a reference BGL from 0 mg/dL to 400 mg/dL. FIG. 16B is a graph showing the Blood Glucose Levels (BGL) mg/dL over a time period of 0 minutes to 100 minutes.

Figure 17:
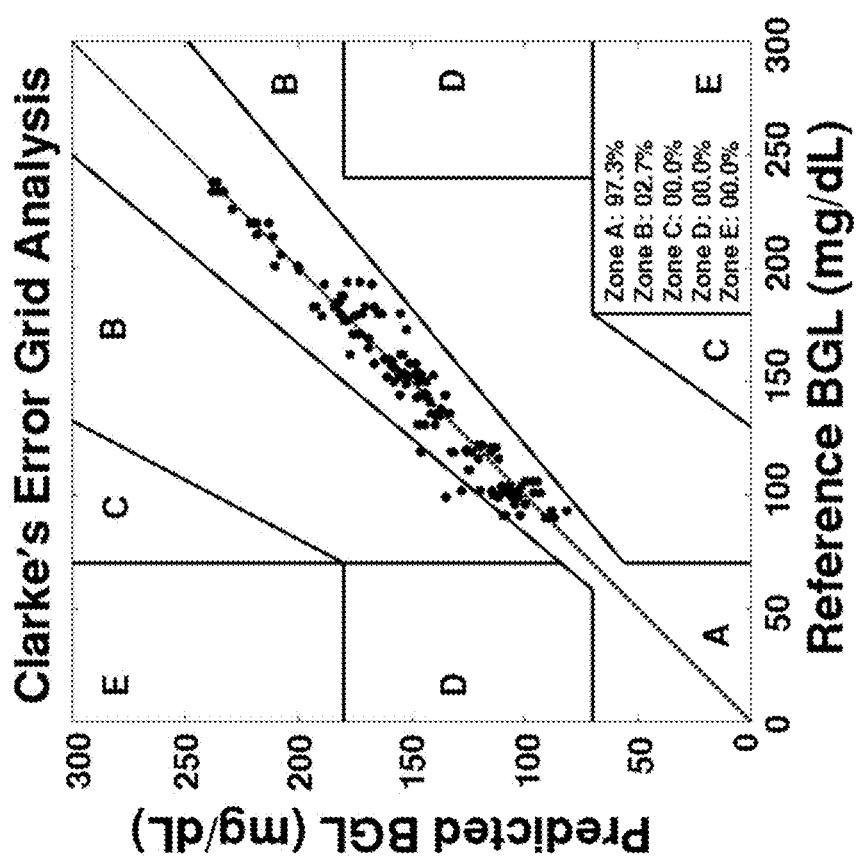
FIG. 17 is a graph of the Clarke's Error Grid analysis showing the Predicted BGL (mg/dL) vs. the Reference BGL mg/dL from 0 to 600 mg/dL.

FIG. 17 is a graph of the Clarke's Error Grid analysis showing the Predicted BGL (mg/dL) vs. the Reference BGL mg/dL from 0 to 600 mg/dL.

System

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

REFERENCES

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A wireless sensor comprising:
    a transmitting antenna array of N×N elements and a receiving antenna array of N×N elements;
    the transmitting antenna array transmits a directive beam through a vein, an artery, or a group of blood vessels into a receiving antenna array that receives the signal sent by the transmitter;
    a received signal is read through a dedicated receiver circuit at the operational frequency of the antenna array or is down-converted to a baseband signal between about 100 MHz and about 600 MHZ;
    the magnitudes of the received signal are captured and monitored; and
    any change in these magnitudes is attributed to a change in certain blood biomarkers such as glucose among others; wherein
        both transmitting and receiving antenna arrays operate at any frequency between about 1 MHz to about 300 GHZ;
        both transmitting and receiving antenna arrays are narrowband or wideband;
        both transmitting and receiving antenna arrays have the same polarization orientation;
        each antenna array in the transmitter and receiver is planar and composed of 16 radiating elements to operate at V-Band and separated by a spacing of about 0.125λ; the antenna array has four copper layers; the top layer consists of about 16 radiating microstrip patches forming the sensing area; the second layer is ground with about 16 cross slots; the third layer is a series feeding network using T-shaped power dividers and sequential rotation underneath each cross slot with a single feed at the input; the bottom layer of the antenna array is a metal plane realized as a reflector; and each two consecutive conductive layers are separated by a dielectric material.

2. The wireless sensor of claim 1, wherein the antenna array achieves wide-band circular polarization by using a cross-slot design and sequential rotation feeding.

3. The wireless sensor of claim 1, wherein the antenna array is designed using a variety of laminates with different dielectric materials and/or different thicknesses.

4. The wireless sensor of claim 1, wherein the top layer [M1] of the antenna array is comprised of a rectangular patch design to resonate at the intended frequency range within the millimeter range of the spectrum and at about 62.25 GHz with a cross in its geometry exactly above the aperture exciting the antenna array elements; each patch has two consecutive perpendicular slots at each of its four corners to help emphasize circular polarization.

5. The top layer of the antenna array of claim 4 represents the sensing area; placing these radiating elements at a small distance from both sides of the material under test as RF transmitter and receiver antennas will cause a specific shift in the received power level; electromagnetic wave propagation principles merged with data analytic algorithms are implemented to extract and monitor variations of the concentration of the blood constituent from the interaction between electromagnetic wave propagation and the blood vessels.

6. The wireless sensor of claim 1, wherein the second layer [M2] of the antenna array is comprised of a ground plane; and sixteen cross slots are etched from this plane to represent sixteen apertures to feed a multi-layer structure antenna array; and the dimensions of the cross-slot are optimized to attain circular polarization.

7. The wireless sensor of claim 6, wherein the third layer [M3] of the antenna array is comprised of a series-feeding network such that each aperture is fed with a single hook-shaped feeding line.

8. The wireless sensor of claim 7, wherein the bottom layer [M4] of the antenna array of is a full-plane reflector used for a 62.25 GHz antenna array to hinder back lobe radiations of the slots in a multi-layer structure.

9. The wireless sensor of claim 1, wherein the antenna array has an extended middle laminate.

10. The wireless sensor of claim 1, further comprising two about 62.25 GHz 4×4 multilayer structure antenna arrays with circular polarization is implemented as two wireless sensors targeting both jugular veins and carotid arteries in the neck with sufficient blood concentration; wherein these sensors are detecting biomarker concentrations or glucose concentrations; a transmitted signal from one antenna array is received by an antenna array at the receiver side; the received signal is down-converted to the baseband, where the received power level varies with the varied glucose concentration in blood.

11. The wireless sensor of claim 10, wherein the antenna array is connected to a transmitter of an about 57 to about 64 GHz transmitter/receiver system and the other is connected to the receiver end.

12. The wireless sensor of claim 10, further comprising a data analysis of the sensing system is implemented at the base-band level; the sensing system presents a high correlation between the power level received at the base-band level and the variation in the concentration of blood constituents.

13. The wireless sensor of claim 11, wherein the signal measured from the receiver is converted using algorithms that allow the transformation of the magnitude of the received power levels into the concentration of the blood constituents via trained models.

14. The wireless sensor of claim 11, wherein the antenna array is a phased array with a continuous beamforming ability, developing a narrow beam that is steerable in any desirable sensing direction without changing the position of the antenna; the phased antenna array at the transmitter is met with another phased antenna array at the receiver side to capture the transmitted signal.

15. The wireless sensor of claim 11, wherein one antenna array at the transmitter is used as a phased antenna array that continuously scans the blood vessels with a narrow beam; and the reflected wave is read and analyzed at the input of the transmitting antenna to extract the various levels of blood biomarkers including glucose.

* * * * *